Figure 1:
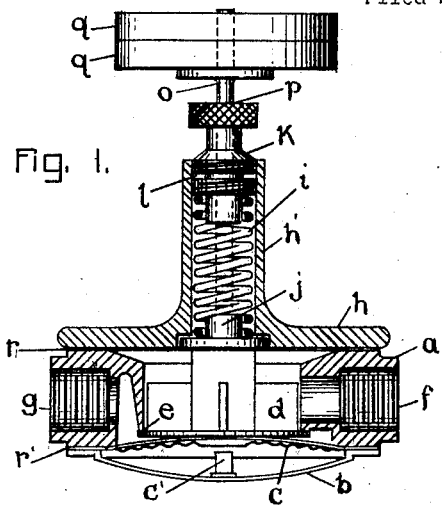

April 15, 1924.

G. WILKINSON

THERMALLY ACTUATED VALVE AND ELECTRIC SWITCH

Filed Sept. 28, 1922

1,490,652

George Wilkinson, Inventor;

By Charles W. Lovett

Attorney

Patented Apr. 15, 1924.

1,490,652

UNITED STATES PATENT OFFICE.

GEORGE WILKINSON, OF HARROGATE, ENGLAND.

THERMALLY-ACTUATED VALVE AND ELECTRIC SWITCH.

Application filed September 28, 1922. Serial No. 591,192.

*To all whom it may concern:*

Be it known that GEORGE WILKINSON, subject of King George of England, residing at Beech Mount, Harrogate, in the county of York, England, has invented certain new and useful Improvements in Thermally-Actuated Valves and Electric Switches, of which the following is such a full, clear, and exact description as will enable others versed in the art to which it appertains to make and use the same.

My invention relates to thermally actuated valves and electric switches, and has for its object to provide an improved means for limiting automatically the amount of heat generated or supplied to the approximate requirement of a particular purpose, and no more.

In accomplishing the objects of my invention I employ a diaphragm, mounted so as to form one side of a closed chamber of any convenient shape, containing liquid of suitably volatility or its equivalent. This chamber provides effective mechanical protection for the thin flexible diaphragm on one side, and the valve chamber a similar protection on the other. Two sides of the valve body are formed of flexible mediums such as rubber, thin corrugated metal, or equivalent; the said diaphragm bears intimately against one of these flexible sides and communicates its movements thereto, this motion serving to close the valve, or vice versa. An engaging element of any suitable design and preferably forming the valve, valve connection, or electric circuit breaking piece, as the case may be, is placed between the flexible side of the valve box, adjacent to the diaphragm, and the corresponding flexible side opposite; on the other side of the latter a resisting effort is exerted in the shape of a weight, spring, or both, or their equivalent. This resisting effort, which is transmitted through the flexible sides of the body via the moving element to the diaphragm, is so arranged that it may be varied and thus cause the diaphragm motion to take place, with the consequent operation of the valve, or circuit breaker, at any desired temperature within limits, having regard to the particular expansive medium used in the containing chamber.

I can, where desirable, as for instance in the case of high temperature control, locate this expansion chamber at any convenient distance from the diaphragm and valve, it being connected thereto by a suitable small pipe or duct or its equivalent.

The flexible sides of the valve chamber, while enabling the valve to be operated, effectively shut out the atmosphere and dust; this is particularly important in the case of the electrical device as it prevents oxidation and corrosion of the electrical contacts, or the accumulation of dust and dirt thereon.

Figure 2:
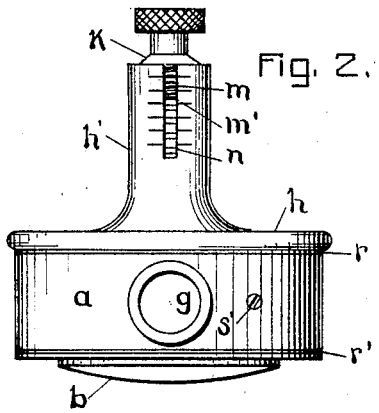
Figure 3:
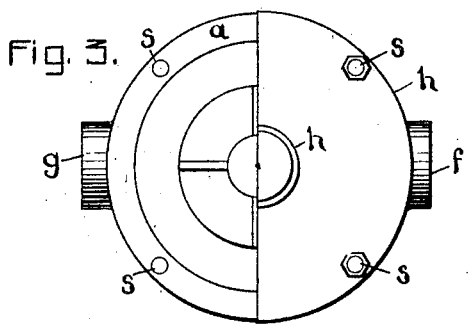
Figure 4:
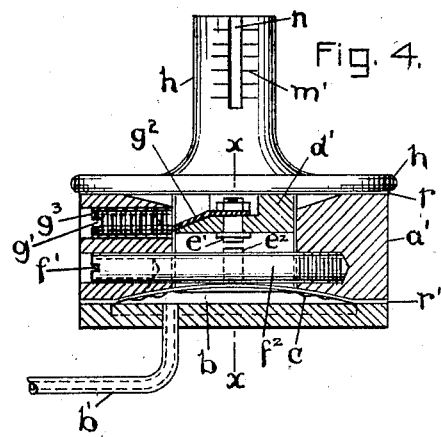
Figure 6:
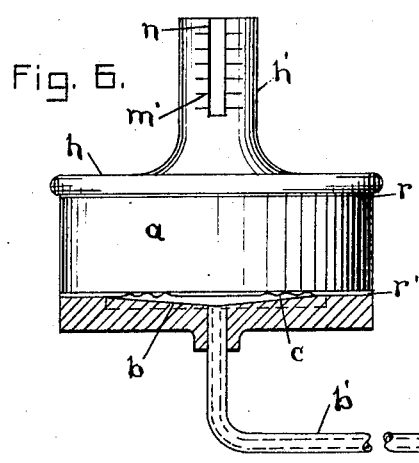
Figure 5:
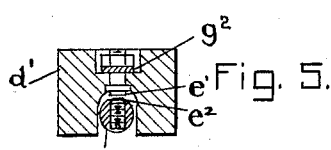

Referring to the accompanying drawing Figure 1 shows a cross section of my specially designed and constructed gas valve, an elevation of which is shown in Figure 2. Figure 3 shows a plan view of my said valve with one-half of the cover cut away. Figure 4 shows my device equipped as a thermal electric switch. Figure 5 shows a section of the moving element on the line $x$—$x$ in Figure 4, Figure 6 shows an elevation of my device as shown in Figure 4, cross sectioned at its base to disclose an unflexed diaphragm.

Similar letters refer to similar parts throughout the various views.

Referring again to Figures 1, 2 and 3, $a$ shows the body of the valve, $b$ shows a hermetically sealed chamber charged with suitable liquid or its equivalent, in which $c$ is the protected flexible diaphragm shown in its flexed or distended condition due to the application of heat, thus pressing the valve $d$ on to its seat $e$; $f$ and $g$ are the inlet and outlet gas connections; $h$ is the cover with the extension $h'$, which accommodates the spring $i$, the thrust of which is on the disc $j$, valve $d$, and diaphragm $c$, is adjustable by the screw $k$, which is furnished with a groove $l$ carrying a tongue piece, $m$ which travels up and down the slot $n$ and indicates the position of the setting by means of the scale $m^1$ marked on each side of the said slot $n$; thus the spring tension can be adjusted as desired and the scale enables the spring to be set to any position corresponding with the temperature desired, the adjusting screw $k$ may be bored through its axis as shown at $p$ and an additional adjustment furnished by means of the flanged rod $o$ sliding freely in the hole $p$ and furnished with suitable weight or weights $q$; this may be supplementary to, or in place of the spring $i$. $C^1$ is a stop, against which the diaphragm $c$ bears when in an unflexed condition, and resists the push of the adjusting spring $i$ or its equivalent and prevents a negative flexing of the diaphragm. It will be obvious that the greater the thrust of the spring or weights upon the diaphragm $c$ is, the higher the temperature must be before the vapour tension or its equivalent within the chamber $b$ is able to flex the diaphragm $c$ and close the valve $d$ upon its seat $e$, and vice versa, thus the temperature adjustment required is readily and accurately obtained. $r$ and $r^1$ are flexible sides which serve to render the valve body tight and at the same time transmit the motions of the diaphragm and resisting spring or weight. I employ material for these flexible sides $r$, $r^1$ which is best suited to the duty the valve has to perform, in some cases I dispense with the flexible side $r^1$ allowing the diaphragm to perform the double duty of closing the expansion chamber $b$ and maintaining its side of the valve body tight and free from leakage. S are screws and nuts or their equivalent which serve to secure the expansion chamber $b$ and the cover $h$ to the valve body, $a$. $S^1$ is a by-pass screw which is adjustable so that a sufficient amount of gas can be passed to prevent total extinction when the valve $d$ is closed.

It is obvious that the valve can be modified to act reciprocally when so desired, in which case the flexing of the diaphragm due to heat will open the valve instead of closing it; this is readily achieved by reversing the positions of the chamber $b$ and the cover $h$ on the valve body.

Referring again to Figures 4–5 and 6, $a'$ is the switch body, preferably of insulating material, as is also the moving element $d'$, $b$ is the expansion chamber containing the heat-affected expansive medium, and $c$ is the diaphragm forming the flexible side of the chamber, the diaphragm being shown in its flexed condition in Fig. 4 holding the electric circuit open or broken at the contacts $e^2$ and $e^1$ by thrusting up the moving element $d'$ against the resistance of the adjustable spring, or its equivalent, located in extension $h^1$ of the cover $h$ as already described with reference to Figs. 1, 2, and 3. The fixed metal bar or rod $f^2$ forms one pole of the switch and carries the adjustable contact screw $e^2$, its outer or exposed end being furnished with a hole $f^1$ which serves as the contact for one pole of a two-pin plug, or its equivalent, which conveys the electric current to the switch, $g^3$ is a metal bar or bush, being the other pole, and provided with hole $g^1$ forming the other connection for the two-pin plug; this bar is connected to the second contact $e^1$ in the moving element $d'$ by the flexible wire connection $g^2$. It will be seen from Fig. 5 that the moving element $d'$ is slotted so as to clear the metal bar $f^2$, and the flexible metal diaphragm is insulated so that when flexed it shall not make electrical contact with the bar $f^2$; this is readily accomplished by the flexible side $r^1$ if of rubber; similarly a rubber flexible side $r$ serves to insulate the other pole $e^1$ from the metal plate imposing the spring thrust; other means of insulation are employed if metallic flexible sides are employed in place of rubber. $e^2$ and $e^1$ are provided with reliable contact surfaces such as platinum or the like when desired. Figs. 4 and 6 show the hermetically sealed chamber $b$ formed in two parts and joined by a capillary tube $b^1$; this is necessary where the valves or switches are used to control high temperatures, otherwise the apparatus would be damaged by the excessive heat. The remote part of the chamber $b$ may be of any suitable size, shape, and material, and located within the furnace or its equivalent, the valve or switch proper being fixed in a cooler and more convenient position for operation and adjustment. For medium temperatures, say for cooking ovens and the like, this extension may take the form of a short stem protruding at right angles from the back plate of the chamber $b$.

My improvements enable a valve to be employed with direct straight-line action and with practically no friction, hence extreme sensitiveness and reliability is obtained.

Furthermore the flexible sides of the valve box being maintained in definite relationship to each other and, if of equal area which I prefer, are in approximate equilibrium, thus the diaphragm has its work reduced to a minimum and its action is very sensitive, especially if combined with any form of equilibrium or balanced valve.

To obtain this equalizing effect it is necessary to secure each flexible side to the internal moving element and this can be done by any convenient means as for instance, by central screw and washers. In the case of low pressures this refinement is not necessary.

For low pressures and small volume, as for instance, when controlling hot water radiators, or gas for gas fires or radiators, I prefer to use a valve of the flat or mushroom type of large area and low lift, thus the travel of the valve for a given area of opening is well within the range of safe diaphragm deflection without producing permanent set or undue stretching.

Where desirable I may use other types of valves such as a balanced swing butterfly valve, or the like, so connected to the diaphragm that the comparatively small motion of the latter is amplified on the balanced valve; such a modification is desirable in the case of large hot water radiators, large volume hot air transmission, cold air for fuel combustion and the like.

The provision of a flexible diaphragm on one side only of the chamber containing the expansive medium enables the other part of the chamber exposed to the heat which is to be controlled to be made of such material, shape and size as is best fitted to resist damage and to transmit the heat variations quickly to the said expansive medium.

In the case of high temperatures beyond the heat limit of liquids, I employ gas, air, or the like, the chamber being hermetically sealed when the working temperature has been approximately reached. The required definite temperature of operation is then obtained by spring or weight adjustment as before described.

I am aware that such a working medium is subject to error due to barometric variations; at high temperatures however such error is relatively small and can be ignored without impairing the practical utility of the device.

I do not desire to confine myself to the specifically described construction or relative arrangement of parts, inasmuch as future practice of the invention may require such various changes and modifications as can well fall within the scope of my invention as defined in the appended claims.

Having now particularly described my invention I claim as new and desire to secure by Letters Patent.

1. A thermostatic device, comprising a hollow body portion having oppositely disposed flexible sides, a closed chamber for containing an expansible fluid secured adjacent to one of the flexible sides of the body portion, and also provided with a flexible side adapted to expand against the adjacent flexible side of the body portion, and an engaging element located between the flexible sides of the body portion and adapted to be shifted to engaging position by the expanding side of the closed chamber operating against the flexible side of the body portion.

2. A thermostatic device, comprising a hollow body portion having oppositely disposed flexible sides, a closed chamber for containing an expansible fluid secured adjacent to one of the flexible sides of the body portion, and also provided with a flexible side adapted to expand against the adjacent flexible side of the body portion, and an unattached engaging element located between the flexible sides of the body portion and adapted to be shifted to engaging position by the expanding sides of the closed chamber operating against the flexible side of the body portion.

3. A thermostatic device, comprising a hollow body portion having oppositely disposed flexible sides, a closed chamber for containing an expansible fluid secured adjacent to one of the flexible sides of the body portion, and also provided with a flexible side adapted to expand against the adjacent flexible side of the body portion, and an engaging element located between the flexible sides of the body portion and adapted to be shifted to engaging position by the expanding sides of the closed chamber operating against the flexible side of the body portion, and a pressure means located at the opposite side of the body portion from the closed chamber and outside of the adjacent flexible side thereof and which is adapted to normally force the engaging element to non-engaging position.

4. A thermostatic device, comprising a hollow body portion having oppositely disposed flexible sides, a closed chamber for containing an expansible fluid secured adjacent to one of the flexible sides of the body portion, and also provided with a flexible side adapted to expand against the adjacent flexible side of the body portion, an engaging element located between the flexible sides of the body portion and adapted to be shifted to engaging position by the expanding sides of the closed chamber operating against the flexible side of the body portion, a pressure means located at the opposite side of the body portion from the closed chamber and outside of the adjacent flexible side thereof and which is adapted to normally force the engaging element to non-engaging position, and a rigid stop means located within said closed chamber to limit the movement of the engaging element in one direction.

5. A thermostatic device, comprising a hollow body portion having oppositely disposed flexible sides, a chamber for containing an expansible fluid located in close relation to one of said flexible sides, whereby said flexible side will be flexed by the expansion of said fluid, an engaging element located between the flexible sides of the body portion and adapted to be shifted to engaging position by the flexible sides adjacent the expansion chamber, and a pressure means for the engaging member located to the outside of the opposite flexible side and which is adapted to force the engaging element to non-engaging position.

6. A thermostatic device, comprising a hollow body portion having oppositely disposed flexible sides, a chamber for containing an expansible fluid located in close relation to one of said flexible sides, whereby said flexible side will be flexed by the expansion of said fluid, an engaging element located between the flexible sides of the body portion and adapted to be shifted to engaging position by the flexible sides adjacent the expansion chamber, a pressure means for the engaging member located to the outside of the opposite flexible side and which is adapted to force the engaging element to non-engaging position, and a tension regulating means having registering scales for said pressure means.

In testimony whereof I affix my signature in the presence of two witnesses.

GEORGE WILKINSON.

Witnesses:
FRED. J. RATCLIFFE,
ROLAND ALDERSON.